United States Patent [19]
Robinson

[11] 3,744,751
[45] July 10, 1973

[54] CHECK VALVE
[75] Inventor: Daniel T. Robinson, Oak Creek, Wis.
[73] Assignee: Milwaukee Valve Company, Inc., Milwaukee, Wis.
[22] Filed: Oct. 21, 1971
[21] Appl. No.: 191,420

[52] U.S. Cl......... 251/276, 251/335 B, 137/329.06, 137/540
[51] Int. Cl............................................ F16k 31/50
[58] Field of Search ................. 251/77, 82, 83, 276, 251/278, 331, 335 B, 368; 137/329.06, 540

[56] References Cited
UNITED STATES PATENTS

| | | | |
|---|---|---|---|
| 630,949 | 8/1899 | Thummel | 251/83 |
| 1,138,338 | 5/1915 | Whitney | 137/540 X |
| 1,873,318 | 8/1932 | Eason, Jr. | 137/540 X |
| 2,239,169 | 4/1941 | Franck | 251/335 B |
| 3,146,523 | 9/1964 | Pessina | 251/368 |

FOREIGN PATENTS OR APPLICATIONS

| | | | |
|---|---|---|---|
| 447,779 | 4/1949 | Italy | 251/83 |

Primary Examiner—Martin P. Schwadron
Assistant Examiner—David R. Matthews
Attorney—John W. Michael, Glenn A. Busé et al.

[57] ABSTRACT

Flow from the inlet to the outlet of the valve is controlled by a spring-loaded check valve cooperating with a seat. The check valve has an annular valve face (made from a temperature-resistant, abrasion-resistant material and carried in a recess in a holder) and a stem guided in a bore provided in an adjustable spindle. The bottom end of the spindle acts as a stop limiting the valve travel upon opening. The opening travel of the check valve can be varied by adjusting the spindle position and flow can be shut off completely by bottoming the spindle against the check valve so it cannot open. A bellows surrounding the spring and spindle isolates the spring and stem guide from the flow system, thereby preventing excessive wear and gumming caused by the presence of the dry bulk material (when used in this type service) and other system contaminants in the moving parts of the valve. The stem guide is vented to the atmosphere to prevent a dash pot effect when the check valve opens.

4 Claims, 2 Drawing Figures

PATENTED JUL 10 1973 3,744,751

Inventor
Daniel T. Robinson
By Glenn A. Buse
Attorney

CHECK VALVE

BACKGROUND OF THE INVENTION

Materials handled in dry bulk form, such as flour, concrete and the like, present special problems for valves used for controlling the flow of pneumatic fluids used in assisting the flow of the dry bulk materials through transfer systems. These materials are highly abrasive and any collection thereof in small crevices of the valves, such as in valve guides or spring guides, cause excessive wear to the moving parts. Also, these materials tend to become paste-like from the baking effect cause by the heat generated by the flowing transporation gas. Thus, check valves, commonly used to prevent back flow of material into the pneumatic pressure system eventually become inoperative or have a sticky, unsuitable operation when the dry materials and other contaminants accumulate in the moving parts. Tractor-trailer units for hauling dry bulk materials frequently use the exhaust gases from the tractor as the source of pneumatic pressure for the unloading system. The various contaminants in the hot exhaust gases compound the gumming problem.

The seats of butterfly valves, commonly used as the shut-off and flow throttling means in the pneumatic system of tractor-trailer units, are particularly vulnerable to the high temperature and abrading effect of the material flowing therethrough. The seats of these butterfly valves must have a cross sectional configuration which effects a seal and yet allows slight deformation by the butterfly so it can be moved to the open position. Therefore, most temperature-resistant, abrasion-resistant materials cannot be used for the seats because their tendency to cold flow results in either a restriction in the operation of the butterfly or leakage.

SUMMARY OF THE INVENTION

The valve described in the Abstract has shutoff and flow checking capabilities. Therefore, separate butterfly and check valves typically used in the pneumatic system of dry bulk material transport units can be replaced by a single valve of this invention. The moving parts of the valve are isolated from the flow system so excessive wear and gumming problems associated with the presence of the material and other system contaminants inside these parts are eliminated. Since the valve face is held in a recess in the holder, cold flow of the material is constrained and, therefore, a wide variety of temperature-resistant, abrasion-resistant materials can be used.

DESCRIPTION OF THE PREFERRED EMBODIMENT

Figure 1:
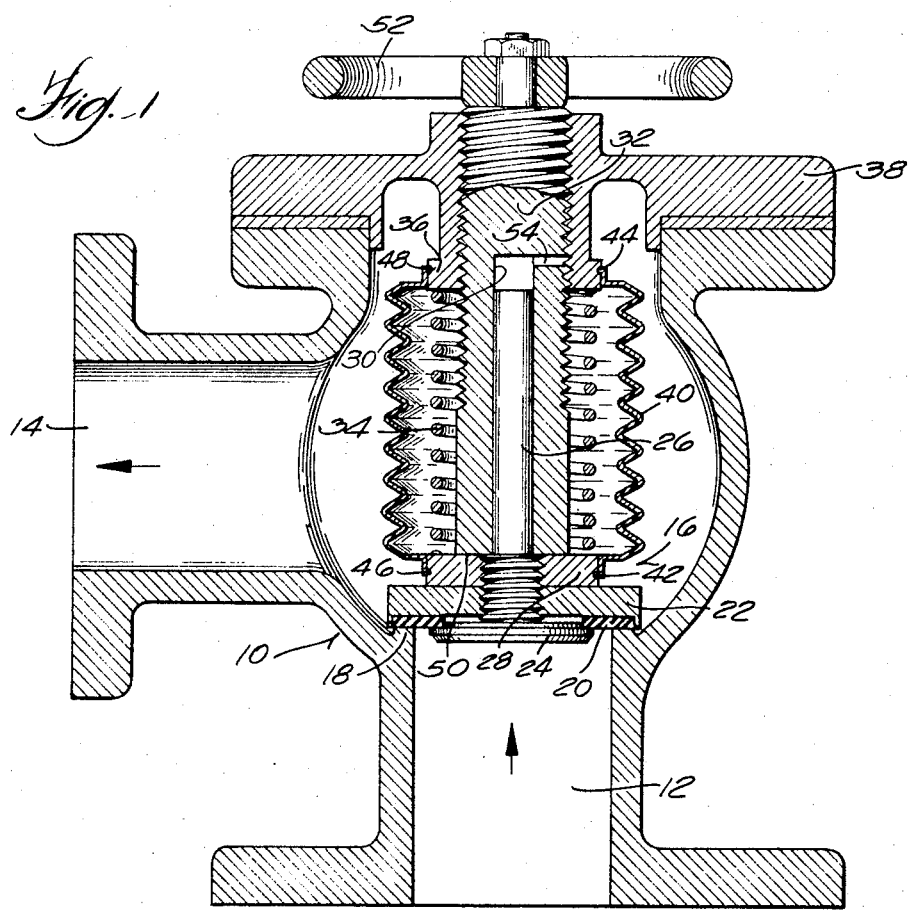
FIG. 1 is a side elevational, cross-sectional view of the valve shown in the shutoff position.

For the purposes of description, the valve of this invention will be described as a control valve used in the unloading system of a tractor-trailer unit for transporting dry cement. However, it should be appreciated that the valve can be used for controlling flow in many other systems.

Valve body 10 includes an inlet 12, which is connected to pneumatic pressure source (not shown), and an outlet 14, which is connected to a conduit (not shown) through which the dry cement is unloaded from the trailer tank. A normally-closed, spring-loaded check valve 16 cooperates with seat 18 to regulate flow from the inlet to the outlet. Although the valve is shown with an angle pattern, it can be made with a straight pattern; in which case the inlet is rotated 90°. Valve 16 has an annular, flat-surfaced, valve face 20 which is carried by holder 22 and held in place in a recess provided in the holder by a flange 24 on the bottom end of valve stem 26 and a retainer 28 threaded onto the lower portion of the valve stem. Valve face 20 is constructed from an abrasion-resistant material, such as Teflon, which is capable of operating in the thermal environment of the system in which the valve is being used without detrimental deformation. Valve stem 26 is slidably mounted in guide 30 bored in spindle 32. Valve face 20 is urged into sealing engagement with seat 18 by spring 34, one end bearing against flange 36 on valve bonnet 38 and the other end bearing against retainer 28.

Spring 34 and stem guide 30 are completely isolated from the flow of dry cement in the unloading system by a bellows 40 which is tightly mounted at the upper end to the periphery of flange 36 and at the lower end to the periphery of retainer 28. Bellows 40 is constructed from a resilient material capable of operating in the thermal environment of the pneumatic system, preferably from elastomeric materials, such as Viton Series materials, Buna-N and the like. Preferably, bellows 40 has integrally molded rings 42, 44 on the opposite ends thereof and retainer 28 and flange 36 are provided with complementary, peripheral grooves 46, 48 respectively. The ends of the bellows are stretched to fit over retainer 28 and flange 36 and, upon relaxation, rings 42, 44 fit snugly into their respective grooves to provide a tight seal against the dry bulk cement flowing through the system and other system contaminants.

Figure 2:
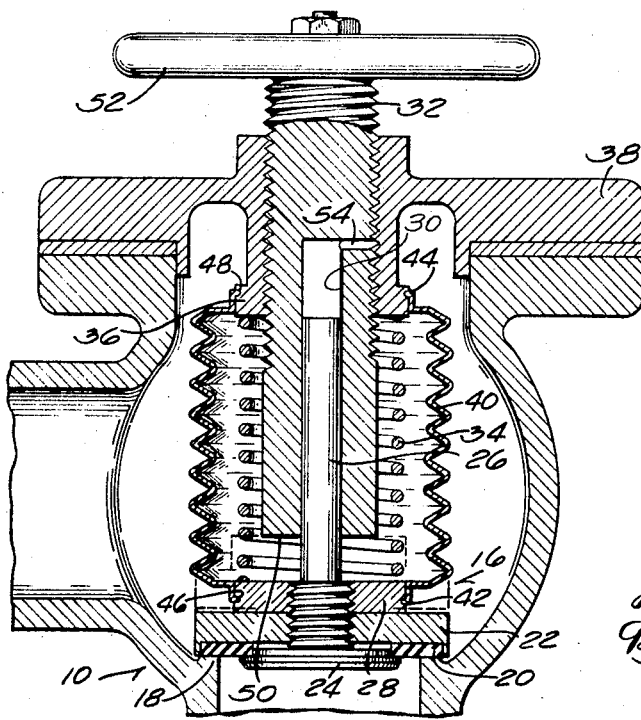
FIG. 2 is a fragmentary, side elevational view, partially sectioned, of the valve shown with the spindle retracted to allow opening of the check valve upon system pressure build-up.

The upper end of spindle 32 is threaded into valve bonnet 38 and the lower end 50 of the spindle acts as a stop limiting the travel of the check valve when it is opened, i.e. when the force of the inlet pressure acting on flange 24, valve face 20 and holder 22 overcomes the biasing force of spring 34. The position of the spindle, and hence the opening travel of the check valve, is controlled by rotation of hand wheel 52 connected to the outer end of the spindle. In the position shown in FIG. 1, the hand wheel has been rotated to a shutoff position where the spindle is bottomed against retainer 28 so the check valve cannot open. As seen in FIG. 2, the spindle has been retracted by the counterclockwise rotation of hand wheel 52 so the check valve can be moved upwardly and the bellows compressed (when the force of the inlet pressure acting thereon exceeds the biasing force of the spring) until the retainer engages the lower end of the spindle. Thus, the valve can act as a shutoff valve and a check valve. Also, once the check valve has been opened, flow of the pressurized gas can be varied by adjusting the position of the spindle by rotation of the hand wheel. Instead of a threaded spindle and hand wheel arrangement, the spindle can be actuated to a retracted position by other suitable means, such as an eccentric cam arrangement where rotation of a handle provides quick opening, a motor driven actuator, etc.

Guide 30 is provided with a vent port 54 and the threads of the spindle and bonnet have sufficient clearance so that air in the guide can vent to the atmosphere through the vent port to prevent a dash pot effect when the check valve opens. The circuitous path of threads prevents the ingress of contaminants into the guide. Other suitable venting means which allow the escape of trapped air and prevent the ingress of contaminants can be used, such as a vertical aperture extending through the spindle to atmosphere with the low relief poppet covering the aperture outlet.

From the above detailed description, it can be seen that the moving parts of a valve arranged in accordance with this invention are completely isolated from the flow system. Hence, the valve can be used in systems handling dry bulk materials at high temperatures without excessive wear and gumming problems associated with valves heretofore used for this service. The shutoff capability of the valve eliminates the need for a separate butterfly shutoff valve and the problems associated therewith. Since the valve face is essentially captured in the recess provided in the holder, the seat is constrained against cold flow and a wide variety of temperature-resistant and abrasion-resistant materials, including many of those which cannot be used as seats for a butterfly shutoff valve, can be used.

I claim:

1. A check valve adaptable for use in systems handling dry bulk materials comprising
   a body having an inlet and outlet;
   a valve seat in said body;
   a check valve member including an annular recess for receiving an annular, flat-surfaced valve ring which cooperates with said seat to control flow of material from said inlet to said outlet;
   a stem connected to and extending from said valve member;
   a spindle threaded into said valve body for adjustable movement therein and including a guide in which said stem is slidably mounted and a bottom which acts as a stop for limiting the opening travel of said valve member;
   means for adjusting the position of said spindle to vary the opening travel of said valve member;
   a spring surrounding said spindle and positioned between said body and said valve to urge said valve ring against said valve seat;
   a resilient sealing member surrounding said spindle and said spring and sealingly connected at the opposite ends to said body and said valve member to thereby isolate said spring and said guide from material flowing from said inlet to said outlet; and
   a vent port in said spindle communicating with said guide and the threaded connection between said spindle and said body, said threaded connection having sufficient clearance to provide a circuitous vent passage from said vent port to the atmosphere.

2. A check valve according to claim 1 wherein said valve ring is made from a cold-flowable, heat-resistant, abrasion-resistant material; and
   said stem includes a flange connected to the bottom and thereof, said flange bearing against a non-seating portion of said valve ring and cooperating with said recess to constrain said valve ring against substantial cold flow.

3. A check valve according to claim 2 wherein said material is Teflon.

4. A check valve according to claim 2 wherein said resilient member is made from a heat-resistant, elastomeric material, is generally cylindrically shaped, and includes an integral inwardly extending circumferential ring at each end which sealingly fits into respective complementary grooves provided in said body and said valve member.

* * * * *